(12) United States Patent
Cui et al.

(10) Patent No.: US 10,178,647 B2
(45) Date of Patent: Jan. 8, 2019

(54) PAGING METHOD, PAGING DEVICE, AND PAGING SYSTEM

(71) Applicant: Beijing Xiaomi Mobile Software Co., Ltd., Beijing (CN)

(72) Inventors: Hengbin Cui, Beijing (CN); Long Sun, Beijing (CN); Qi Ge, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/613,513

(22) Filed: Jun. 5, 2017

(65) Prior Publication Data

US 2017/0359800 A1 Dec. 14, 2017

(30) Foreign Application Priority Data

Jun. 8, 2016 (WO) ................ PCT/CN2016/085249

(51) Int. Cl.
*H04W 68/00* (2009.01)
*H04W 68/02* (2009.01)
*H04W 84/02* (2009.01)
*H04W 64/00* (2009.01)
*H04W 4/50* (2018.01)
(Continued)

(52) U.S. Cl.
CPC ........... *H04W 68/02* (2013.01); *H04W 64/00* (2013.01); *H04W 84/02* (2013.01); *H04W 4/50* (2018.02); *H04W 8/183* (2013.01); *H04W 8/26* (2013.01); *H04W 36/0022* (2013.01); *H04W 64/006* (2013.01)

(58) Field of Classification Search
CPC ......... H04W 68/02; H04W 4/50; H04W 8/26; H04W 8/183; H04W 84/02; H04W 36/0022; H04W 64/00; H04W 64/006
See application file for complete search history.

(56) References Cited

U.S. PATENT DOCUMENTS

2013/0128865 A1* 5/2013 Wu .................... H04W 36/0022
370/331
2013/0303235 A1* 11/2013 Zheng .................... H04W 88/06
455/552.1
(Continued)

FOREIGN PATENT DOCUMENTS

CN 101137195 A 3/2008
CN 105530024 A 4/2016
(Continued)

OTHER PUBLICATIONS

Extended Search Report for European Application No. 17157461.9 from the European Patent Office, dated Sep. 13, 2017.
(Continued)

*Primary Examiner* — Khai M Nguyen
(74) *Attorney, Agent, or Firm* — Finnegan, Henderson, Farabow, Garrett & Dunner LLP (57) ABSTRACT

A paging method for use in a network access device, includes: acquiring an identifier of a terminal being called in a voice service of a Packet Switched domain; generating a paging message according to the identifier of the terminal being called, the paging message including a core network domain name field and a value of the core network domain name field corresponding to the voice service of the Packet Switched domain; and sending the paging message to the terminal being called.

12 Claims, 7 Drawing Sheets

(51) Int. Cl.
    *H04W 8/26*     (2009.01)
    *H04W 8/18*     (2009.01)
    *H04W 36/00*     (2009.01)

(56) References Cited

U.S. PATENT DOCUMENTS

| | | | |
|---|---|---|---|
| 2014/0128082 A1* | 5/2014 | Chirayil | H04W 68/02 455/438 |
| 2014/0140287 A1 | 5/2014 | Cheng | |
| 2015/0004973 A1* | 1/2015 | Gude | H04W 76/025 455/435.2 |
| 2015/0023258 A1 | 1/2015 | Hu et al. | |
| 2015/0230199 A1 | 8/2015 | Jeong et al. | |
| 2015/0289221 A1* | 10/2015 | Nayak | H04W 60/005 455/435.1 |
| 2016/0014644 A1* | 1/2016 | Yeoum | H04W 36/0022 370/331 |
| 2017/0094485 A1* | 3/2017 | Saxena | H04L 41/0813 |

FOREIGN PATENT DOCUMENTS

| | | | |
|---|---|---|---|
| CN | 105554884 A | 5/2016 | |
| RU | 2477933 C2 | 3/2013 | |
| WO | WO 2010/019364 A1 | 2/2010 | |
| WO | WO 2011/162667 A1 | 12/2011 | |
| WO | WO 2015/016546 A1 | 2/2015 | |

OTHER PUBLICATIONS

English version of International Search Report of PCT Application No. PCT/CN2016/085249, dated Mar. 2, 2017, issued by the ISA/CN—State Intellectual Property Office of the P.R. China.

$3^{rd}$ *Generation Partnership Project; Technical Specification Group Services and System Aspects; Circuit Switched (CS) fallback in Evolved Packet System (EPS); Stage 2 (Release 13)*, 3GPP Organizational Partners, 3GPP TS 23.272 V13.3.0 (Mar. 2016), pp. 1-101, Mar. 2016.

$3^{rd}$ *Generation Partnership Project; Technical Specification Group Services and System Aspects; Circuit Switched (CS) fallback in Evolved Packet System (EPS); Stage 2 (Release 13)*, 3GPP TS 23.272 v13.3.0 (Mar. 2016), 6 pages.

* cited by examiner

PAGING METHOD, PAGING DEVICE, AND PAGING SYSTEM

CROSS-REFERENCE TO RELATED APPLICATIONS

This application is based upon and claims priority to PCT Application No. PCT/CN2016/085249, filed on Jun. 8, 2016, the entire contents thereof are incorporated herein by reference.

TECHNICAL FIELD

The present disclosure generally relates to the technical field of communication, and more particularly, to a paging method, a paging device, and a paging system.

BACKGROUND

Compared with 2G/3G networks, a Long Term Evolution (LTE) network only has a Packet Switched (PS) domain, and has no Circuit Switched (CS) domain. In the LTE network, a Voice over LTE (VoLTE) based on an IP Multimedia Subsystem (IMS) is a solution to realize voice service. The VoLTE can cooperate with the LTE network or a 4G Evolution Packet Core (EPC) network to realize an end-to-end voice service based on the PS domain.

To call a terminal, a base station may send a paging message to the terminal. The paging message carries a core network domain (Cn-Domain) name field. The Cn-Domain name field may have a value of PS or CS. That is, when the voice call is performed with VoLTE, the Cn-Domain name field has a value of PS, and when the voice call is performed with 2G/3G based on the traditional circuit domain, the Cn-Domain name field has a value of CS.

SUMMARY

In a first aspect of the present disclosure, there is provided a paging method for use in a network access device, including: acquiring an identifier of a terminal being called in a voice service of a Packet Switched domain; generating a paging message according to the identifier of the terminal being called, the paging message including a core network domain name field and a value of the core network domain name field corresponding to the voice service of the Packet Switched domain; and sending the paging message to the terminal being called.

In a second aspect of the present disclosure, there is provided a paging method for use in a terminal, including: receiving a paging message; parsing and acquiring a value of a core network domain name field from the paging message; and when the value of the core network domain name field corresponds to a voice service of a Packet Switched domain, processing the paging message with a first priority which corresponds to the voice service of the Packet Switched domain.

In a third aspect of the present disclosure, there is provided a network access device, including: a processor; and a memory for storing instructions executable by the processor; wherein the processor is configured to perform: acquiring an identifier of a terminal being called in a voice service of a Packet Switched domain; generating a paging message according to the identifier of the terminal being called, the paging message including a core network domain name field and a value of the core network domain name field corresponding to the voice service of the Packet Switched domain; and sending the paging message to the terminal being called.

In a fourth aspect of the present disclosure, there is provided a terminal, including: a processor; and a memory for storing instructions executable by the processor; wherein the processor is configured to perform: receiving a paging message; parsing and acquiring a value of a core network domain name field from the paging message; and when the value of the core network domain name field corresponds to a voice service of the Packet Switched domain, processing the paging message with a first priority which corresponds to the voice service of the Packet Switched domain.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

As used herein, a "unit" may refer to a program or instruction stored in a memory for implementing a function. Also, as used herein, a "module" may refer to a functional structure divided logically. A "module" may be implemented with hardware, or software, or a combination of software and hardware.

In an existing Long Term Evolution (LTE) system, a Packet Switched (PS) domain provides a voice service and a data service. The voice service may be a Voice over LTE (VoLTE) service, and the data service may be a web browsing service, an instant messaging service or a navigation service, or the like. Regardless of whether the PS domain provides a voice service or a data service, when a network access device sends a paging message to a terminal, a core network domain (Cn-Domain) name field in the paging message will always have a value of PS.

The terminal may be a dual-card dual-standby single-channel terminal. Since a dual-card dual-standby single-channel terminal can support a first Subscriber Identity Module (SIM) card and a second SIM card with only one set of antenna(s), use permission of the antenna resource may be allocated to a service with a higher priority of the first SIM card and the second SIM card in the dual-card dual-standby single-channel terminal. Generally, a paging service and a location-region updating service from a Circuit Switched (CS) domain may have the highest priority since they have real-time requirements, and a paging service from the PS domain may have a lower priority since users generally tend to use the data service from the PS domain.

However, in some circumstances, for example, when the location-region updating service of the second SIM card in the dual-card dual-standby single-channel terminal occupies the antenna resource, and at the same time, the first SIM card receives a paging message using the VoLTE service, since the location-region updating service of the second SIM card has a higher priority, the paging message using the VoLTE service received by the first SIM card has a lower priority, the paging message may not be allocated with the antenna resource, and the calling cannot be answered timely, causing a missed call. Since it is more likely to compete for the antenna resource in the dual-card dual-standby single-channel terminal, missed calls occur more often than in a single-card single-standby terminal. In order to reduce or avoid missing calls, the present disclosure provides the following embodiments.

Figure 1:
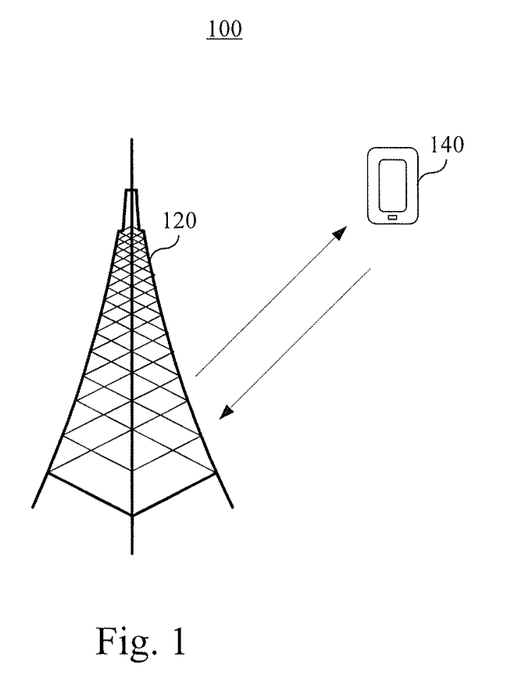
FIG. 1 is a schematic diagram illustrating a paging system according to an exemplary embodiment.

FIG. 1 is a schematic diagram illustrating a paging system 100 according to an exemplary embodiment. The paging system 100 includes a network access device 120 and a terminal 140.

The network access device 120 may have functions of sending a paging message, sending downlink data or instructions, and receiving uplink data or instructions. In different mobile communication systems, the network access device 120 may have the same or similar functions, or may have different names or specific implementation forms. For example, the network access device 120 may be a Base Transceiver Station (BTS) in a Global System for Mobile communication (GSM) or a Code Division Multiple Access (CDMA) system. Also for example, the network access device 120 may be a base station (NodeB) in a Universal Mobile Telecommunications System (UMTS). As another example, the network access device 120 may be an evolution Node B (eNB or e-NodeB) in a Long Term Evolution (LTE) system. In actual networking, the network access device 120 may be implemented as a macro base station, a micro base station, a pico base station, a repeater, or the like. The present disclosure does not limit a number of network access devices 120 and their installation locations.

The terminal 140 may have functions of sending an uplink reference signal, receiving a downlink reference signal, sending uplink data or instructions, and receiving downlink data or instructions. In different mobile communication systems, the terminal 140 may have the same or similar functions, or may have different names or specific implementation forms. For example, the terminal 140 may be a subscriber unit, a subscriber station, a mobile station, a mobile, a remote station, an access point, a remote terminal, an access terminal, a user terminal, a user agent, a user device, or a user equipment (UE). In the actual networking, the terminal 140 may be implemented as a mobile phone, a tablet PC, a smart appliance, an intelligent instrument, a device in an Internet of things, a device in a car network, or the like. The present disclosure does not limit a number of terminals 140 and their locations.

Generally, the terminal 140 may reside in a cell provided by the network access device 120. When the terminal 140 communicates with the network access device 120, the terminal 140 may be in an RRC_CONNECT state and may establish an RRC (Radio Resource Control) connection. When there is no need for the terminal 140 to communicate with the network access device 120, the terminal 140 may be in an RRC_IDLE (idle) state.

In exemplary embodiments, when the terminal 140 is in the RRC_IDLE state and there is a voice service of the CS domain, e.g., a conventional call, the network access device 120 may send a paging message to the terminal 140 and the Cn-Domain name field in the paging message may have a value of CS.

In exemplary embodiments, when the terminal 140 is in the RRC_IDLE state and there is a voice service of the PS domain, e.g., a VoLTE call, the network access device 120 may send a paging message to the terminal 140 and the Cn-Domain name field in the paging message may have a value of PS-VoLTE. Through the value PS-VoLTE, the terminal 140 may learn about that the paging message is triggered by a VoLTE service, and then raise the priority of processing this paging message, In exemplary embodiments, when the terminal 140 is in the RRC_IDLE state and there is a data service of the PS domain, the network access device 120 may send a paging message to the terminal 140 and the Cn-Domain name field in the paging message may have a value of PS or PS-Data.

Figure 2:
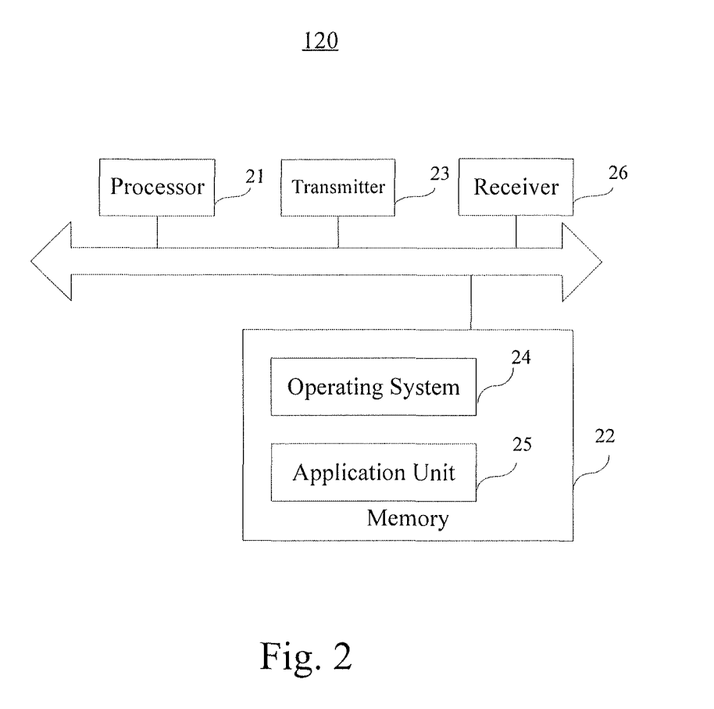
FIG. 2 is a block diagram illustrating a network access device according to an exemplary embodiment.

FIG. 2 is a block diagram illustrating the network access device 120 according to an exemplary embodiment. Referring to FIG. 2, the network access device 120 includes a processor 21, a memory 22, a transmitter 23, and a receiver 26.

The processor 21 is coupled to the memory 22, and includes one or more processing cores. The processor 21 may perform various functions and process information by running software program and units.

The memory 22 is configured to store software programs and units. The memory 22 may store an operating system 24 and at least one application unit 25 for implementing a function.

The application unit 25 may include a processing unit and a sending unit (not shown). The processing unit is configured to acquire an identifier of a terminal being called in a voice service using the PS domain, and generate a paging message according to the identifier of the terminal being called. The paging message includes a Cn-Domain name field, and a value of the Cn-Domain name field may correspond to a voice service of the PS domain. The sending unit is configured to send the paging message to the terminal being called.

In addition, the memory 22 may be implemented by any type of a volatile memory device, or a nonvolatile memory device, or a combination thereof, such as a static random access memory (SRAM), an electrically erasable programmable read only memory (EEPROM), an erasable programmable read only memory (EPROM), a programmable read-only memory (PROM), a read-only memory (ROM), a magnetic memory, a flash memory, a magnetic disk, or an optical disk.

The transmitter 23 may include a modem unit and an antenna (not shown). For example, the antenna may be a multiple input multiple output (MIMO) antenna, and the MIMO antenna may support multi-antenna port transmitting. Also for example, the MIMO antenna may include at least two transmitting antennas.

The receiver 26 may include a configuration the same as or similar to that of the transmitter 23. For example, the receiver 26 may include a modem unit and an antenna (not shown). Also for example, the antenna may be a MIMO antenna, and the MIMO antenna may include at least two receiving antennas.

It should be appreciated by those skilled in the art that the configuration of the network access device 120 as shown in FIG. 2 does not constitute restriction to the network access device 120, and the network access device 120 may include greater or fewer components than those shown in FIG. 2, or may include some combinations of the components shown in FIG. 2, or include different components from those shown in FIG. 2.

Figure 3:
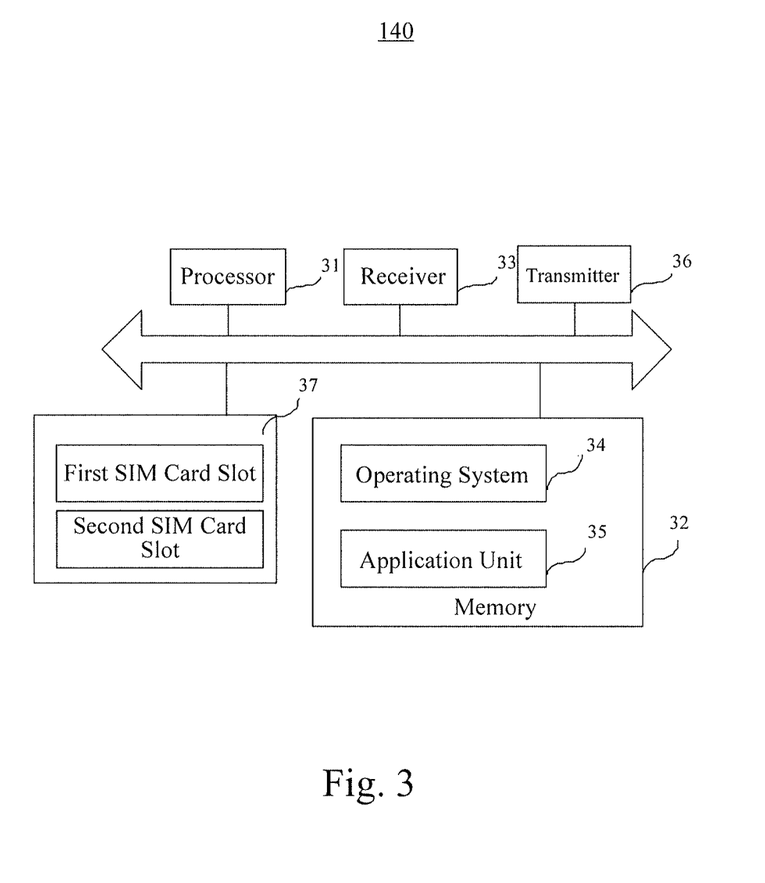
FIG. 3 is a block diagram illustrating a terminal according to an exemplary embodiment.

FIG. 3 is a block diagram illustrating a terminal 140 according to an exemplary embodiment. The terminal 140 includes a processor 31, a memory 32, a receiver 33, and a transmitter 36.

The processor 31 is coupled to the memory 32, and includes one or more processing cores. The processor 31 may perform various functions and process information by running software program and units.

The memory 32 is configured to store software programs and units. The memory 32 may further store an operating system 34 and at least one application unit 35 for implementing a function.

The application unit 35 may include a receiving unit (not shown) configured to receive a paging message; and a processing unit (not shown) configured to parse and acquire a value of a Cn-Domain name field from the paging message and further configured to, when the value of the Cn-Domain name field corresponds to a voice service of the PS domain, process the paging message with a first priority which corresponds to a voice service of the PS domain.

In addition, the memory 32 may be implemented by any type of a volatile memory device or a nonvolatile memory device or a combination thereof, such as a static random access memory (SRAM), an electrically erasable programmable read only memory (EEPROM), an erasable programmable read only memory (EPROM), a programmable read-only memory (PROM), a read-only memory (ROM), a magnetic memory, a flash memory, a magnetic disk, or an optical disk.

The receiver 33 may include a modem unit and an antenna (not shown). For example, the antenna may be a MIMO antenna, and the MIMO antenna may support multi-antenna port receiving. Also for example, the MIMO antenna may include at least two receiving antennas.

The transmitter 36 may include a configuration the same as or similar to that of the receiver 33. For example, the transmitter 36 may include a modem unit and a MIMO antenna (not shown). Also for example, the MIMO antenna may include at least two transmitting antennas.

In an embodiment, the terminal 140 may also include two SIM card slots 37, and the terminal 140 may support a dual-card dual-standby single-channel function through the two SIM card slots 37.

It should be appreciated by those skilled in the art that the configuration of the terminal 140 as shown in FIG. 3 does not constitute restriction to the terminal 140, and the terminal 140 may include greater or fewer components than those shown in FIG. 3, or may include some combinations of the components shown in FIG. 3, or include different components from those shown in FIG. 3.

Figure 4:
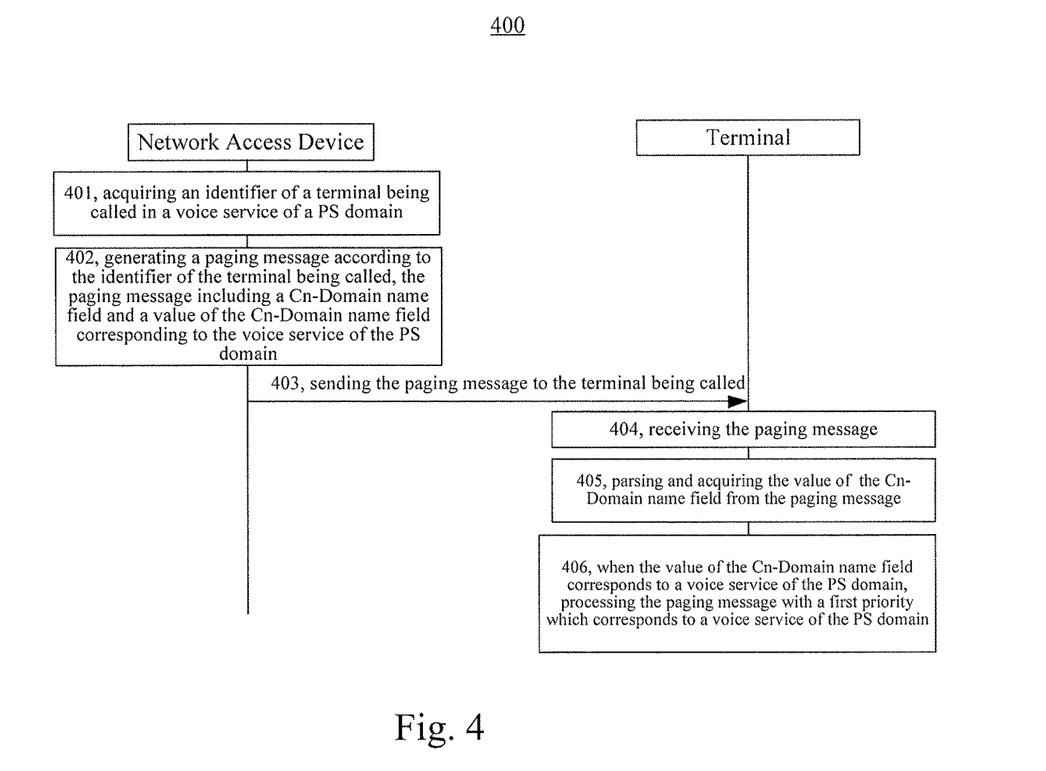
FIG. 4 is a flow chart illustrating a method for sending a message according to an exemplary embodiment.

FIG. 4 is a flow chart illustrating a paging method 400 according to an exemplary embodiment. For example, the paging method 400 may be applied in the paging system 100 (FIG. 1). The paging method 400 includes the following steps.

At step 401, a network access device acquires an identifier of a terminal being called, e.g., by another terminal, in a voice service of a PS domain.

At step 402, the network access device generates a paging message according to the identifier of the terminal being called, the paging message including a Cn-Domain name field and a value of the Cn-Domain name field corresponding to the voice service of the PS domain.

At step 403, the network access device sends the paging message to the terminal being called.

At step 404, the terminal being called receives the paging message.

At step 405, the terminal being called parses and acquires the value of the Cn-Domain name field from the paging message.

At step 406, when the value of the Cn-Domain name field corresponds to a voice service of the PS domain, the paging message is processed with a first priority which corresponds to a voice service of the PS domain.

Accordingly, in the paging method 400 provided by the present embodiment, by additionally providing a value of the Cn-Domain name field of a current paging message, the terminal being called may learn about whether the current paging message corresponds to the voice service of the PS domain according to the value of the Cn-Domain name field. It can solve the problem that the voice service of the PS domain may be missed due to a relatively low priority of such paging message in traditional methods. It can achieve an effect that the terminal being called may learn about a type of the service at a paging stage, and process the voice service of the PS domain with a higher priority.

Figure 5:
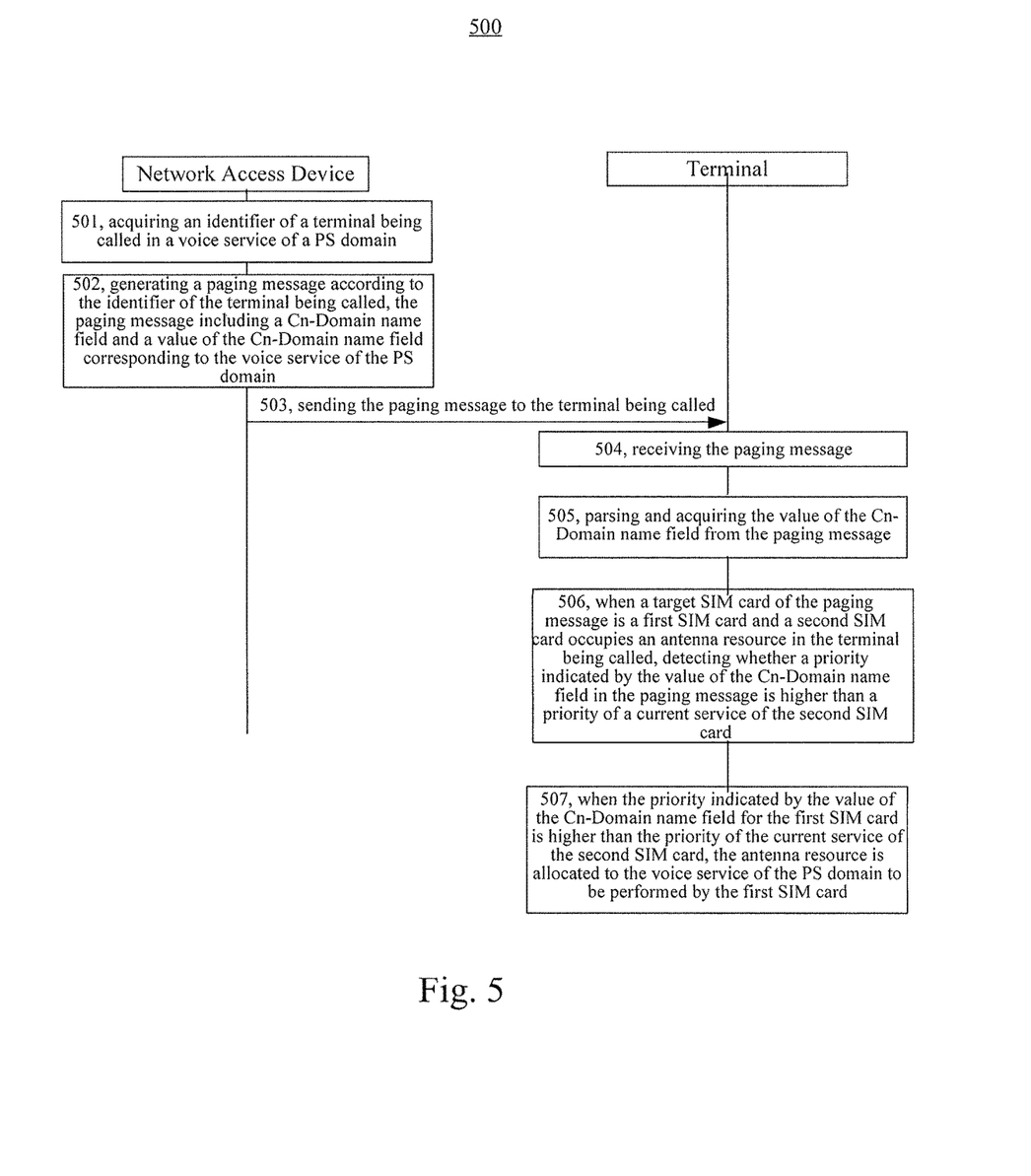
FIG. 5 is a flow chart illustrating a method for sending a message according to an exemplary embodiment.

FIG. 5 is a flow chart illustrating a paging method 500 according to an exemplary embodiment. For example, the paging method 500 may be applied in the paging system 100 (FIG. 1), in which the terminal 140 is a dual-card dual-standby single-channel terminal. The paging method 500 includes the following steps.

At step 501, a network access device acquires an identifier of a terminal being called in a voice service of a PS domain.

For example, a calling terminal may call the terminal (i.e., the terminal being called) using a voice service of the PS domain. When the network access device receives a calling request from the calling terminal, the network access device may acquire an identifier of the terminal being called.

Also for example, in an LTE communication system, the voice service of the PS domain may refer to a VoLTE service. In other communication systems, there may be voice services of the PS domain of other types.

As another example, the identifier of the terminal being called may be an International Mobile Equipment Identity (IMEI). When the terminal being called is a dual-card dual-standby single-channel terminal, each SIM card in the terminal being called may have an identifier.

At step 502, the network access device generates a paging message according to the identifier of the terminal being called, the paging message including a Cn-Domain name field and a value of the Cn-Domain name field corresponding to the voice service of the PS domain.

As an example, the paging message may have the following format:

```
Message cl: paging:
{
    pagingRecordList
    {
        {
            Ue-Identity s-TMSI;
            Cn-Domain;
        }
    }
}
```

In the above example, paging represents that the message is a paging message. Ue-Identity represents a field for the identifier of the terminal being called. In the paging message, the identifier of the terminal being called is a SAE-Temporary Mobile Subscriber Identity (S-TMSI). Cn-Domain represents the Cn-Domain name field.

In the present embodiment, the Cn-Domain name field may have one of the following three values: CS, PS-VoLTE, and PS. When there is a voice service from the CS domain, the Cn-Domain name field may have a value of CS. When there is a voice service from the PS domain, the Cn-Domain name field may have a value of PS-VoLTE. When there is a data service from the PC domain, the Cn-Domain name field may have a value of PS.

It should be noted that, although in the embodiment the Cn-Domain name field uses a value PS-VoLTE to represent the voice service of the PS domain, it is merely an example, and the present disclosure does not restrict the specific form of the value of the Cn-Domain name field. For example, the value of the Cn-Domain name field may take other Character strings such as VoLTE, ps-VoLTE, and ps-Voice, as long as it may indicate that the value of the Cn-Domain name field corresponds to the voice service of the PS domain.

At step 503, the network access device sends the paging message to the terminal being called.

For example, in the LTE system, the network access device may send the paging message to the terminal being called during a previously agreed monitoring time period, and the terminal being called may receive the paging message through a monitoring manner.

Also for example, the network access device may firstly send a P Cell Radio Network Temporary Identifier (P-RNTI) corresponding to the terminal being called through a Physical Downlink Control Channel (PDCCH). The P-RNTI represents that in the current paging period there is a paging message corresponding to the terminal being called. Then, the network access device may send the paging message to the terminal being called through a Physical Downlink Shared Channel (PDSCH).

As another example, the paging message may carry the identifier of the terminal being called and the Cn-Domain name field (e.g., PS-VoLTE).

At step 504, the terminal being called receives the paging message.

For example, the terminal being called may monitor whether there is a P-RNTI corresponding to the terminal itself through the PDCCH during a previously agreed monitoring time period. When there is a P-RNTI corresponding to the terminal itself, the terminal being called may determine that there is a paging message corresponding to the terminal itself. Then, the terminal being called may receive the paging message corresponding to itself through the PDSCH based on PDSCH parameters indicated through the PDCCH. The PDSCH parameters are sent from the network access device for informing the terminal how to receive the paging message, for example, a position of a time-frequency resource of the paging message in the PDSCH, a decoding mode and the like.

At step 505, the terminal being called parses and acquires the value of the Cn-Domain name field from the paging message.

In the exemplary embodiment, after the terminal being called receives the paging message, the terminal being called parses and acquires the value of the Cn-Domain name field from the paging message. The value of the Cn-Domain name field may have any one of the following three values: CS, PS-VoLTE, and PS. CS indicates a voice service of the CS domain; PS-VoLTE indicates a voice service of the PS domain; and PS (or PS-Data) indicates a data service of the PS domain.

The terminal being called may process the paging message with a priority corresponding to the value of the Cn-Domain name field. For example, PS-VoLTE corresponds to a first priority, and PS corresponds to a second priority lower than the first priority, since a voice service indicated by PS-VoLTE requires a processing priority higher than that of a data service indicated by PS.

In exemplary embodiments, there may be many types of services provided in the terminal. In the following Table 1, there are listed corresponding relationships between exemplary services and priorities provided in the terminal as an example. The specific implementation form or corresponding manner of the corresponding relationships between services and priorities are not limited in the present disclosure.

TABLE 1

| Service Type | Priority |
| --- | --- |
| Paging message having a value of CS, location-region updating, cells switching, other services | Highest |
| Paging message having a value of PS-VoLTE | Second Highest |
| Short message | Medium |
| Paging message having a value of PS | Low |

In the exemplary embodiment, when the value of the Cn-Domain name field corresponds to the voice service of the PS domain, the process proceeds to step 506.

At step 506, when a target SIM card of the paging message is a first SIM card and a second SIM card occupies an antenna resource in the terminal being called, it is detected whether a priority indicated by the value of the Cn-Domain name field in the paging message is higher than a priority of a current service of the second SIM card.

In the exemplary embodiment, when the antenna resource in the terminal is being occupied by the second SIM card, the service of the second SIM card may be a service which requires a relatively high priority such as a voice service of the CS domain or location-region updating, or may be a service which requires a relatively low priority such as a data service of the PS domain. The terminal may compare the priority indicated by the value of the Cn-Domain name field in the paging message for the first SIM card and the priority of the current service of the second SIM card. When the priority indicated by the value of the Cn-Domain name field is of a higher priority, the process proceeds to step 507. Otherwise, processing of the paging message may be postponed.

At step 507, when the priority indicated by the value of the Cn-Domain name field for the first SIM card is higher than the priority of the current service of the second SIM card, the antenna resource is allocated to the voice service of the PS domain, which corresponds to the value of the Cn-Domain name field, to be performed by the first SIM card.

In the exemplary embodiment, the terminal may allocate the antenna resource to the VoLTE service based on the priority indicated by the value of the Cn-Domain name field, such that the current paging message may be responded as soon as possible, and the VoLTE service may be established in a timely manner.

Accordingly, in the paging method 500 provided by the present embodiment, by additionally providing a value for the Cn-Domain name field of a current paging message, the terminal being called may learn about whether the current paging message corresponds to the voice service of the PS domain according to the value of the Cn-Domain name field. It can solve the problem that the voice service of the PS domain may be missed due to a relatively low priority of such paging message in traditional methods. It can achieve an effect that the terminal being called may learn about a type of the service in the paging stage, and process the voice service of the PS domain with a higher priority.

The paging method provided by the present embodiment, when applied in a dual-card dual-standby single-channel terminal, can effectively avoid the problem of missing a VoLTE call by the dual-card dual-standby single-channel terminal. Thereby, it can reduce or avoid a possibility of missing a VoLTE call by a dual-card dual-standby single-channel terminal, to timely respond to a VoLTE call and provide a high-quality voice call.

It should be noted that, in the above embodiment, the steps performed by the terminal may be implemented as a separate paging method on the terminal side, and performed by a processor executing instructions in a memory of the terminal. Likewise, the steps performed by the network access device may be implemented as a separate paging method on the network access device side, and be performed by a processor executing instructions in a memory of the network access device.

Figure 6:
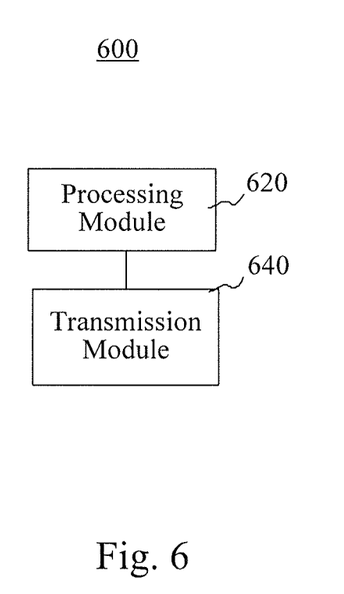
FIG. 6 is a block diagram illustrating a device for sending a message according to an exemplary embodiment.

FIG. 6 is a block diagram illustrating a paging device 600 according to an exemplary embodiment. The paging device 600 may be implemented as the whole or a part of the network access device 120 (FIG. 1) with a dedicated hardware circuit, or a combination of hardware and software. The paging device 600 includes a processing module 620 and a transmission module 640.

The processing module 620 is configured to acquire an identifier of a terminal being called in a voice service of a PS domain, the processing module 620 being configured to generate a paging message according to the identifier of the terminal being called, the paging message including a Cn-Domain name field and a value of the Cn-Domain name field corresponding to the voice service of the PS domain.

The transmission module 640 is configured to send the paging message to the terminal being called.

In an embodiment, the voice service of the PS domain is a Voice over Long Term Evolution VoLTE service, and the value of the Cn-Domain name field is PS-VoLTE.

Accordingly, in the paging device 600 provided by the present embodiment, by additionally providing a value for the Cn-Domain name field of a current paging message, the terminal being called may learn about whether the current paging message corresponds to the voice service of the PS domain according to the value of the Cn-Domain name field. It can solve the problem that the voice service of the PS domain may be missed due to a relatively low priority of such paging message in traditional methods. It can achieve an effect that the terminal being called may learn about the type of the service in the paging stage, and may process the voice service of the PS domain with a higher priority.

Figure 7:
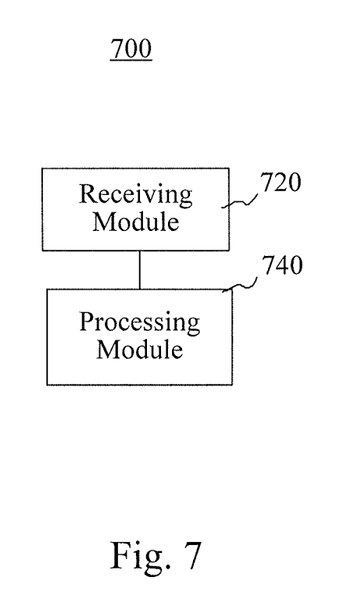
FIG. 7 is a block diagram illustrating a device for sending a message according to an exemplary embodiment.

FIG. 7 is a block diagram illustrating a paging device 700 according to an exemplary embodiment. The paging device 700 may be implemented as the whole or a part of the terminal 140 (FIG. 1) with a dedicated hardware circuit, or a combination of hardware and software. The paging device 700 includes a receiving module 720 configured to receive a paging message; and a processing module 740 configured to parse and acquire a value of a Cn-Domain name field from the paging message. The processing module 740 is configured to, when the value of the Cn-Domain name field corresponds to a voice service of the PS domain, process the paging message with a first priority which corresponds to a voice service of the PS domain.

In an embodiment, the voice service of the PS domain is a VoLTE service, and the value of the Cn-Domain name field is PS-VoLTE.

In an embodiment, the first priority is higher than a second priority which corresponds to a data service of the PS domain.

In an embodiment, the paging device 700 is applied in a dual-card dual-standby single-channel terminal. The processing module 740 is configured to, when a target SIM card of the paging message is a first SIM card and a second SIM card occupies an antenna resource in the terminal being called, detect whether a priority indicated by the value of the Cn-Domain name field of the paging message is higher than a priority of a current service of the second SIM card; and when the priority indicated by the value of the Cn-Domain name field of the paging message is higher than the priority of the current service, allocate the antenna resource to the voice service of the PS domain corresponding to the priority indicated by the value of the Cn-Domain name field.

Accordingly, in the paging device 700 provided by the present embodiment, by additionally providing a value for the Cn-Domain name field of a current paging message, the terminal being called may learn about whether the current paging message corresponds to the voice service of the PS domain according to the value of the Cn-Domain name field. It can solve the problem that the voice service of the PS domain may be missed due to a relatively low priority of such paging message in traditional methods. It can achieve an effect that the terminal being called may learn about a type of the service at a paging stage, and process the voice service of the PS domain with a higher priority.

The paging method 700 provided by the present embodiment, when applied in a dual-card dual-standby single-channel terminal, can effectively reduce the problem of missing a VoLTE call by the dual-card dual-standby single-channel terminal. Thereby, it can reduce a possibility of missing a VoLTE call by a dual-card dual-standby single-channel terminal, to timely respond to a VoLTE call and provide a high-quality voice call.

With respect to the devices in the above embodiments, the specific manners for performing operations for individual modules therein have been described in detail in the embodiments regarding the relevant methods, which will not be repeated herein.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof It is intended that the scope of the invention only be limited by the appended claims.

What is claimed is:

1. A paging method for use in a network access device, comprising:
    acquiring an identifier of a terminal being called in a voice service of a Packet Switched domain, the terminal being configured to operate with first and second Subscriber Identity Module (SIM) cards;
    generating a paging message according to the identifier of the terminal being called, the paging message including a core network domain name field and a value of the core network domain name field corresponding to the voice service of the Packet Switched domain, the value indicating a processing priority of the voice service of the Packet Switched domain; and
    sending the paging message to the terminal being called, the paging message configured to cause the terminal to:
        process the paging message with a first priority which corresponds to the voice service of the Packet Switched domain;
        when a target SIM card of the paging message is the first SIM card and the second SIM card is occupying an antenna resource in the terminal, detect whether the first priority is higher than a second priority of a current service of the second SIM card; and
        when the first priority is higher than the second priority, allocate the antenna resource to the voice service of the Packet Switched domain corresponding to the first priority.

2. The method of claim 1, wherein the voice service of the Packet Switched domain is a Voice over Long Term Evolution (VoLTE) service, and the value of the core network domain name field indicates a Packet Switched domain VoLTE (PS-VoLTE).

3. A paging method for use in a terminal configured to operate with first and second Subscriber Identity Module (SIM) cards, the paging method comprising:
    receiving a paging message;
    parsing and acquiring a value of a core network domain name field from the paging message; and
    when the value of the core network domain name field corresponds to a voice service of a Packet Switched domain, processing the paging message with a first priority which corresponds to the voice service of the Packet Switched domain, further comprising:
        when a target SIM card of the paging message is the first SIM card and the second SIM card occupies an antenna resource in the terminal, detecting whether the first priority is higher than a second priority of a current service of the second SIM card; and
        when the first priority is higher than the second priority, allocating the antenna resource to the voice service of the Packet Switched domain corresponding to the first priority.

4. The method of claim 3, wherein the voice service of the Packet Switched domain is a Voice over Long Term Evolution (VoLTE) service, and the value of the core network domain name field is Packet Switched domain VoLTE (PS-VoLTE).

5. The method of claim 4, further comprising:
    providing the voice service of the Packet Switched domain with the first priority; and
    providing a data service of the Packet Switched domain with a second priority lower than the first priority.

6. The method of claim 3, further comprising:
    providing the voice service of the Packet Switched domain with the first priority; and
    providing a data service of the Packet Switched domain with a second priority lower than the first priority.

7. A network access device, comprising:
    a processor; and
    a memory for storing instructions executable by the processor;
    wherein the processor is configured to perform:
        acquiring an identifier of a terminal being called in a voice service of a Packet Switched domain, the terminal being configured to operate with first and second Subscriber Identity Module (SIM) cards;
        generating a paging message according to the identifier of the terminal being called, the paging message including a core network domain name field and a value of the core network domain name field corresponding to the voice service of the Packet Switched domain, the value indicating a processing priority of the voice service of the Packet Switched domain; and
        sending the paging message to the terminal being called, the paging message configured to cause the terminal to:
            process the paging message with a first priority which corresponds to the voice service of the Packet Switched domain;
            when a target SIM card of the paging message is the first SIM card and the second SIM card is occupying an antenna resource in the terminal, detect whether the first priority is higher than a second priority of a current service of the second SIM card; and
            when the first priority is higher than the second priority, allocate the antenna resource to the voice service of the Packet Switched domain corresponding to the first priority.

8. The device of claim 7, wherein the voice service of the Packet Switched domain is a Voice over Long Term Evolution (VoLTE) service, and the value of the core network domain name field indicates a Packet Switched domain VoLTE (PS-VoLTE).

9. A terminal configured to operate with first and second Subscriber Identity Module (SIM) cards, comprising:
    a processor; and
    a memory for storing instructions executable by the processor;
    wherein the processor is configured to perform:
        receiving a paging message;
        parsing and acquiring a value of a core network domain name field from the paging message; and
        when the value of the core network domain name field corresponds to a voice service of a Packet Switched domain, processing the paging message with a first priority which corresponds to the voice service of the Packet Switched domain, further comprising:
            when a target SIM card of the paging message is the first SIM card and the second SIM card occupies an antenna resource in the terminal, detecting whether the first priority is higher than a second priority of a current service of the second SIM card; and when the first priority is higher than the second priority, allocating the antenna resource to the voice service of the Packet Switched domain corresponding to the first priority.

10. The terminal of claim 9, wherein the voice service of the Packet Switched domain is a Voice over Long Term Evolution (VoLTE) service, and the value of the core network domain name field indicates a Packet Switched domain VoLTE (PS-VoLTE).

11. The terminal of claim 10, wherein the processor is further configured to perform:
    providing the voice service of the Packet Switched domain with the first priority; and
    providing a data service of the Packet Switched domain with a second priority lower than the first priority.

12. The terminal of claim 9, wherein the processor is further configured to perform:
    providing the voice service of the Packet Switched domain with the first priority; and
    providing a data service of the Packet Switched domain with a second priority lower than the first priority.

\* \* \* \* \*